United States Patent [19]
DuRee et al.

[11] Patent Number: 6,160,871
[45] Date of Patent: Dec. 12, 2000

[54] COMMUNICATIONS TEST SYSTEM

[75] Inventors: Albert Daniel DuRee, Independence, Mo.; William Lyle Wiley, Olathe, Kans.

[73] Assignee: Sprint Communications Company, L.P., Kansas City, Mo.

[21] Appl. No.: 09/058,642

[22] Filed: Apr. 10, 1998

[51] Int. Cl.[7] ............................. H04M 1/24; H04M 3/08; H04M 3/22
[52] U.S. Cl. ........................ 379/9; 379/5; 379/6; 379/27
[58] Field of Search ................................... 379/1, 15, 27, 379/29, 32, 5, 6, 9–10

[56] References Cited

U.S. PATENT DOCUMENTS

| | | | |
|---|---|---|---|
| 5,809,108 | 9/1998 | Thompson et al. | 379/15 |
| 5,825,780 | 10/1998 | Christie . | |
| 5,825,849 | 10/1998 | Garland et al. | 379/1 |
| 5,835,566 | 11/1998 | Cowgill | 379/29 |
| 5,946,372 | 8/1999 | Jones et al. | 379/1 |
| 5,991,301 | 11/1999 | Christie . | |

OTHER PUBLICATIONS

Bosco, P., et al., "A Laboratory For AIN Service Design And Validation," pp. 566–571, Chicago, International Conference on Communications, vol. II., Jun. 14, 1992.

Johnson, M. A., et al., "New Service Testing Functions For Advanced Intelligent Networks," pp. 709–720, 1992, Memphis, TN, IEEE 1992 Network Operations and Management Symposium, vol. III, Apr. 6, 1992.

*Primary Examiner*—Duc Nguyen
*Attorney, Agent, or Firm*—Harley R. Ball

[57] ABSTRACT

The invention is a test system that gives the user a single point of control to generate calls and run tests on a switching system for use in a communications network. The test system is capable of generating calls through a tandem switching system without using a local access switch. The test system is operationally coupled to the switching system by a signaling link and a call connection. The test system receives a first user request to generate a call. The test system transfers signaling to the switching system over the signaling link to cause the switching system to extend the call connection. The test system receives a second user request to run a test, and applies the test to the call connection. In some embodiments, the test system includes a web server that interfaces with a web browser operated by the user. The web server transfers information for screen displays to the web browser. The web server collects user requests from the web browser to generate calls and run tests. The web server transfers signaling, such as an initial address message, to a signaling point for formatting. The signaling point forwards the signaling to the switching system to generate calls. The web server also transfers a test instruction to test equipment. The test equipment applies the test to the call connection and returns the test result to the web server. The web server displays the test result to the user through the web browser.

54 Claims, 5 Drawing Sheets

COMMUNICATIONS TEST SYSTEM

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

The invention is related to the field of communications test systems, and in particular, to a test call system and a graphical user interface that inter-operate to run tests on a switching system.

Switching systems establish call connections through a communications network in response to signaling. On a typical long distance call, the caller transmits dialed digits to a local access switch. The local access switch processes the dialed digits and extends the call connection to a tandem switch. The local access switch also transfers signaling to the tandem switch. The tandem switch processes the signaling to extend the call connection and transfer signaling to a tandem switch in the long distance network. This process is repeated until the call connection is extended to the local access switch that serves the called party. Thus, the caller and the called party are each connected to their respective local access switch. The two local access switches are connected to each other through a series of tandem switches.

The tandem switches are complex systems that require significant testing before they are deployed in a network. New types of tandem switching systems are being developed to take advantage of advanced technologies. For example, distributed switching systems that use external call processors and Asynchronous Transfer Mode (ATM) network elements are being developed. It is critical that these advanced systems undergo thorough testing before they are deployed in the network.

Testing typically entails the generation of calls through the switching system, so tests can be applied to the line during the calls. The calls are generated by establishing a call connection to the switching system and transferring signaling to the switching system. The switching system extends the call connection in response to the signaling. After the testing is complete, the call connection is torn down by transferring additional signaling to the switching system.

At present, two separate systems are required to test tandem switches. A local access switch is required to generate and transfer the signaling to the tandem switch. Test equipment is then required to apply the test to the line. The user must control the local access switch to generate and transmit signaling to the tandem switch. The user must separately control the test equipment to apply the test.

The current testing configuration and process is lacking. The local access switch is complex and expensive. In addition, the user must separately control the local access switch and the test equipment. There is a need for a test system that allows a user to run tests on a tandem switching system without requiring a local access switch and without requiring the control of separate systems.

SUMMARY

The invention solves the above problem by providing a test system that gives the user a single point of control to generate calls and run tests on a switching system for use in a communication network. The test system is capable of generating calls through a tandem switching system without using a local access switch.

The test system is operationally coupled to the switching system by a signaling link and a. call connection. The test system receives a first user request to generate a call. The test system transfers signaling to the switching system over the signaling link to cause the switching system to extend the call connection. The test system receives a second user request to run a test, and applies the test to the call connection.

In some embodiments, the test system includes a web server that interfaces with a web browser operated by the user. The web server transfers information for screen displays to the web browser. The web server collects user requests from the web browser to generate calls and run tests. The web server transfers signaling, such as an initial address message, to a signaling point for formatting. The signaling point forwards the signaling to the switching system to generate calls. The web server also transfers a test instruction to test equipment. The test equipment applies the test to the call connection and returns the test result to the web server. The web server displays the test result to the user through the web browser.

DETAILED DESCRIPTION

Figure 1:
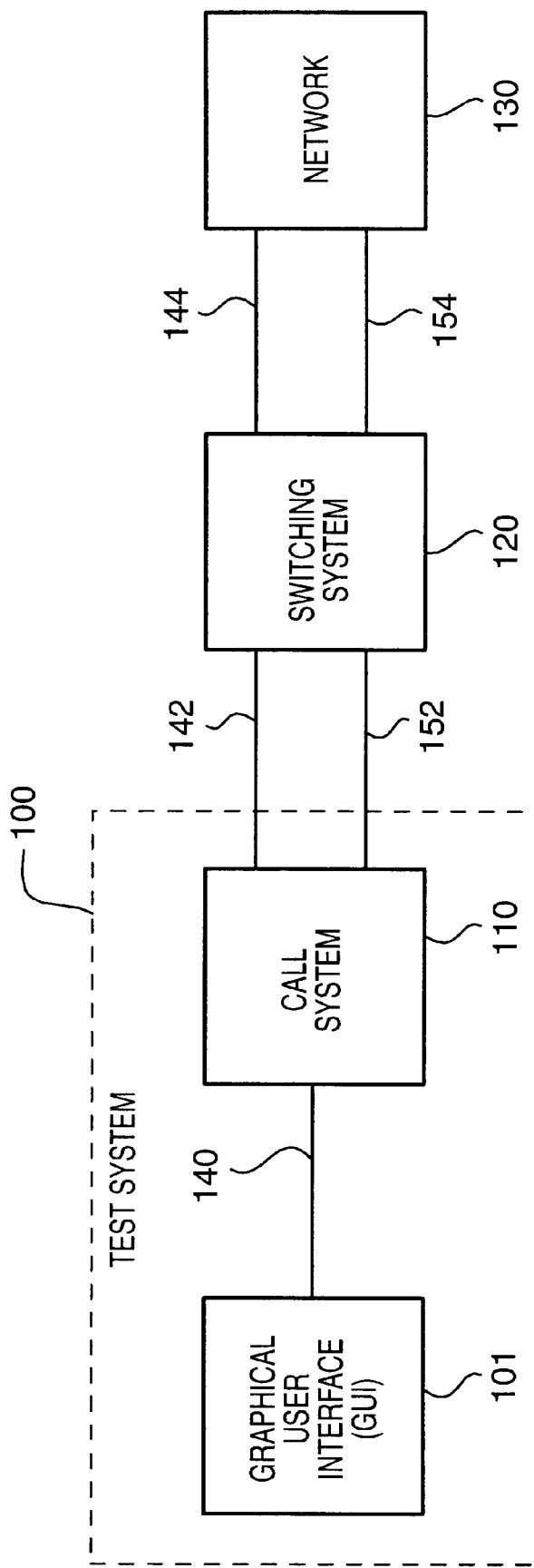
FIG. 1 is a block diagram of the test system in an embodiment of the invention.
Figure 2:
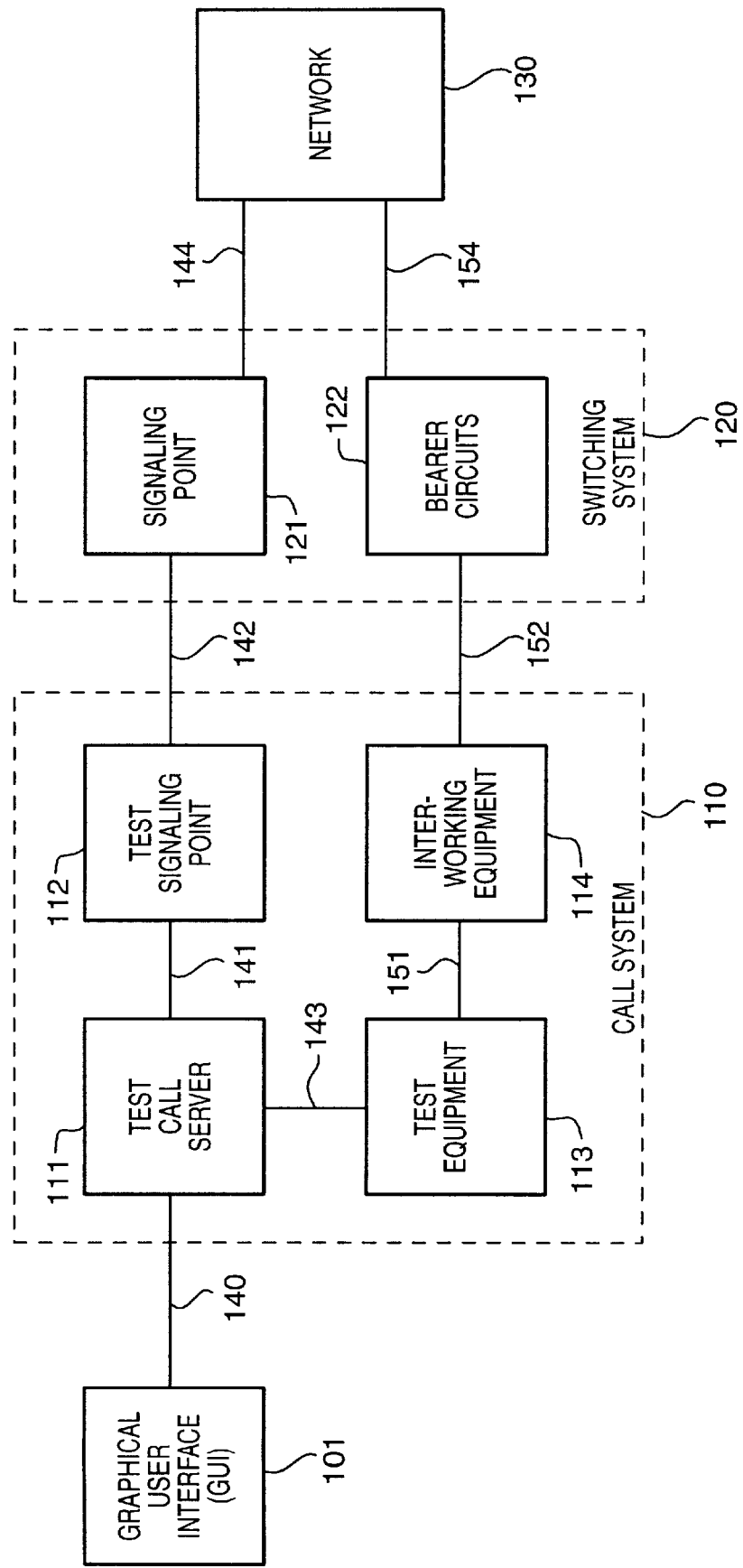
FIG. 2 is a block diagram of the call system and switching system in an embodiment of the invention.

Test System Configuration—FIGS. 1–2

FIG. 1 depicts a test system 100, a switching system 120, and a network 130. The test system 100 is comprised of a Graphical User Interface (GUI) 101 and a call system 110 connected by a data link 140. The call system 110 is connected to the switching system 120 by a signaling link 142 and a bearer connection 152. The switching system 120 is connected to the network 130 by a signaling link 144 and a bearer connection 154.

The GUI 101 could be any terminal that can display graphical screens to a user and allow the user to make selections and inputs. In some embodiments of the invention, the GUI 101 is a conventional personal computer running a conventional web browser and the graphical screens are generated by executing Java applets. The GUI 101 allows the user to connect to the call system 110 over the data link 140. The GUI 101 also allows the user to direct the call system 110 to generate or receive calls, to run tests and return results, and to release calls.

The call system 110 is a computer system that provides menus to the user through the GUI 101. The menus could be comprised of Java applets. The call system 110 generates and releases calls through the switching system 120 by transferring signaling over the signaling link 142. In some embodiments of the invention, the signaling is Signaling System #7 (SS7). Those skilled in the art will recognize other forms of signaling that could be used in the context of the invention, such as C7, Integrated Services Digital Network (ISDN), Asynchronous Transfer Mode (ATM), or TR-303. In some embodiments of the invention, the bearer connections 152 and 154 include a DS0. Those skilled in the art will also recognize other forms of bearer connections that could be used in the context of the invention, such as ISDN, ATM, Time Division Multiplex (TDM), superframe, or frame relay. In some embodiments of the invention, the signaling links and the bearer connections could be combined into a single communications path.

The switching system 120 could be any system that extends the bearer connection 152 in response to signaling. The switching system 120 extends the bearer connection 152 to the bearer connection 154 and transmits signaling over the signaling link 144. Advantageously, the switching system 120 could be a tandem switching system that operates between two local access switches. One example of a tandem switching system is a class 4 switch, such as the DMS-250 provided by Nortel.

The switching system could also be a distributed system comprised of a signaling processor and a network element where the network element could be an ATM multiplexer and/or ATM switch. Such a system is disclosed in U.S. patent applications Ser. No.: 08/568,551, entitled "Method, System, and Apparatus for Telecommunications Control"; 08/525,897, entitled "Broadband Communications System"; 08/525,050, entitled "System for Managing Telecommunications"; and 09/027,008, entitled "System and Method for Connecting a Call with an Interworking System."

The network 130 could be any network operational to receive signaling and a bearer connection from the switching system 120. Examples of the network 130 include a TDM network or an ATM network. In some embodiments of the invention, the switching system 120 can originate and terminate calls without the network 130. This would be the case if the call origination and termination are directly connected to the switching system 120.

FIG. 2 depicts the call system 110 and the switching system 120 in greater detail. The call system 110 is comprised of a test call server 111, a test signaling point 112, test equipment 113, and an interworking unit 114. The switching system 120 is comprised of a signaling point 121 and bearer circuits 122. The switching system 120 typically includes other elements, such a processor and matrix, that are omitted for clarity.

The GUI 101 is connected to the test call server over the data link 140. The test call server is connected to the test signaling point 112 by a data link 141. The test signaling point 112 is connected to the signaling point 121 by a signaling link 142. The signaling point 142 is connected to the network 130 by the signaling link 144. In some embodiments of the invention, the signaling link 142 could be an SS7 F link and the signaling link 144 could be SS7 A links to a Signal Transfer Point (STP) in the network 130.

The test call server 111 is connected to the test equipment 113 by a data link 143. In some embodiments of the invention, the data link 143 is an Ethernet local area network connection transferring ASCII test instructions. The test equipment 113 is connected to the interworking equipment 114 by a bearer connection 151. The interworking equipment 114 is connected to the bearer circuits 122 by a bearer connection 152. The bearer circuits 122 are connected to the network 130 by a bearer connection 154. The bearer connections 151, 152, and 154 are typically fill duplex connections. In some embodiments of the invention, the bearer connection 151 is a T1 transporting a DS0, and the bearer connection 152 is an OC-3 transporting the DS0. A Circuit Identification Code (CIC) identifies the DS0.

The test call server 111 provides test options to the user through the GUI 101. In some embodiments of the invention, the test call server 111 is a conventional web server. The test call server 111 generates and releases calls through the switching system 120 by transferring signaling to the test signaling point 112. The test call server 111 also directs the test equipment 113 to run tests selected by the user.

The test signaling point 112 formats the signaling from the test call server 111 and forwards the signaling to the signaling point 121. The test signaling point 112 also receives signaling from the signaling point 121 and forwards the signaling to the test call server 111. If SS7 signaling is used, then the test signaling point 112 applies Message Transfer Part (MTP) functionality to the signaling. In some embodiments of the invention, the test signaling point 112 is a single-link signaling point such as the ONE-LINK SPECTRA provided by INET of Plano, Tex.

The test equipment 113 runs tests over the bearer connection 151 in response to test instructions from test call server 111. Some examples of tests are bit error rate, analog voice, data pattern, and echo return. Those skilled in the art will recognize many other tests that could also be performed by the test equipment 113. One example of the test equipment 113 is the FIREBERD 310 provided by Telecommunications Technology Corporation of Germantown, Md.

The interworking unit 114 maps the bearer connection 151 from the test equipment 113 to the bearer connection 152 to the switching system 120. If the bearer connections 151 and 152 are equivalent and do not need mapping, then the interworking equipment 114 can be omitted. If the bearer connection 151 is a T1 transporting a DS0 and the bearer connection 152 is an OC-3 transporting the DS0, then an example of the interworking equipment 114 is the TITAN 3/1 Digital Cross-Connect provided by Tellabs of Lisle, Ill.

Figure 3:
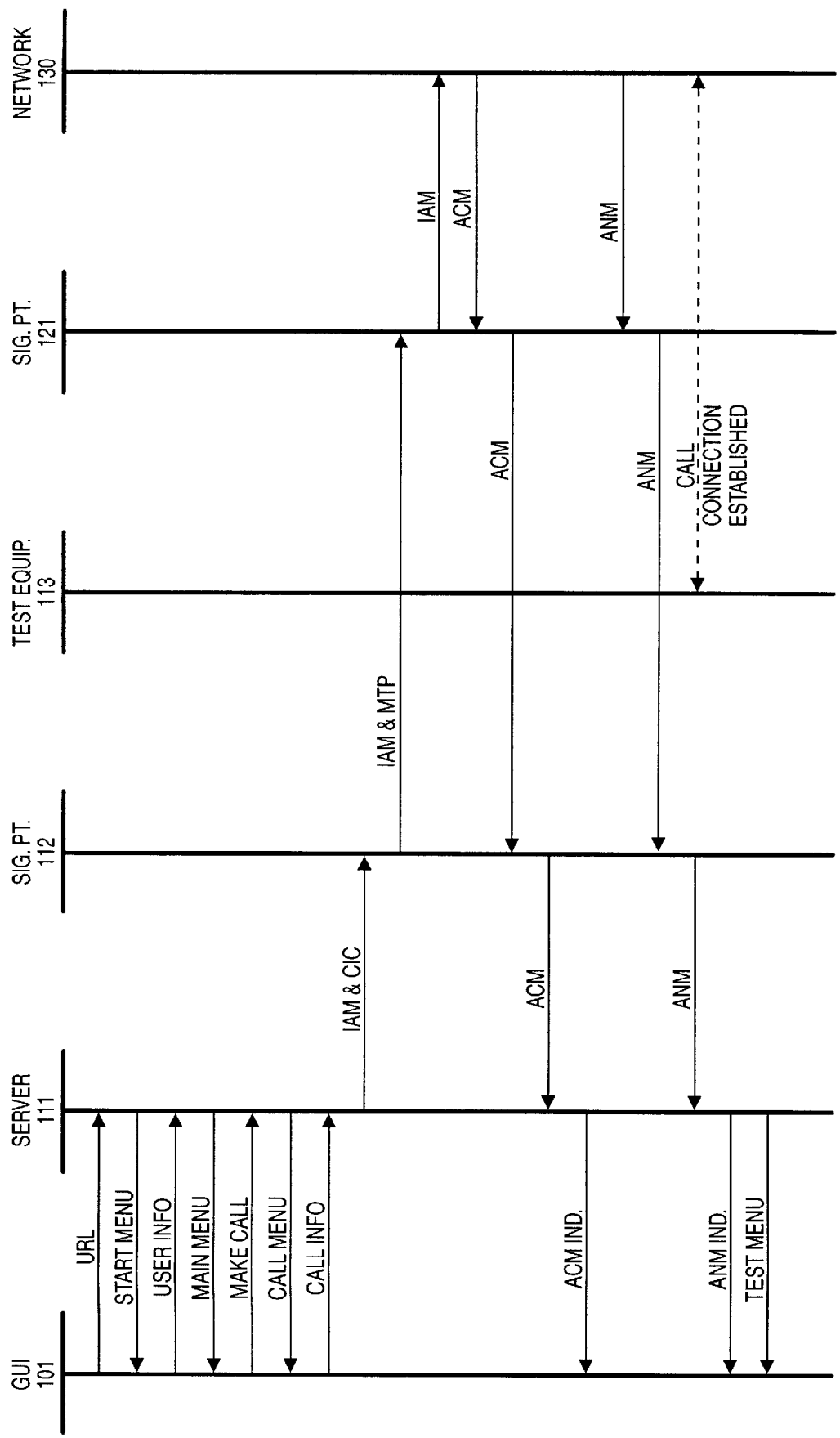
FIGS. 3–5 are process diagrams for an embodiment of the invention.
Figure 4:
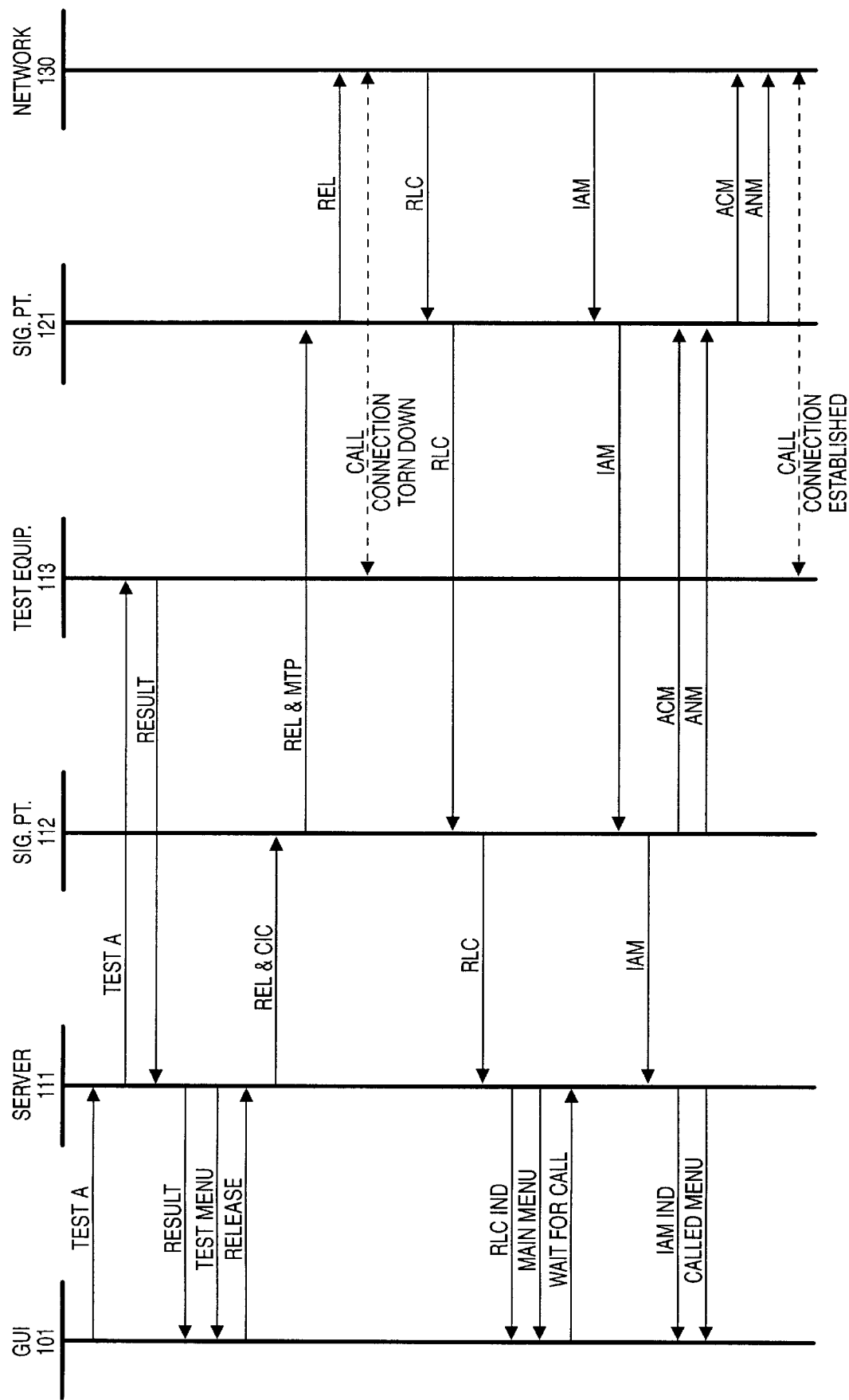
Figure 5:
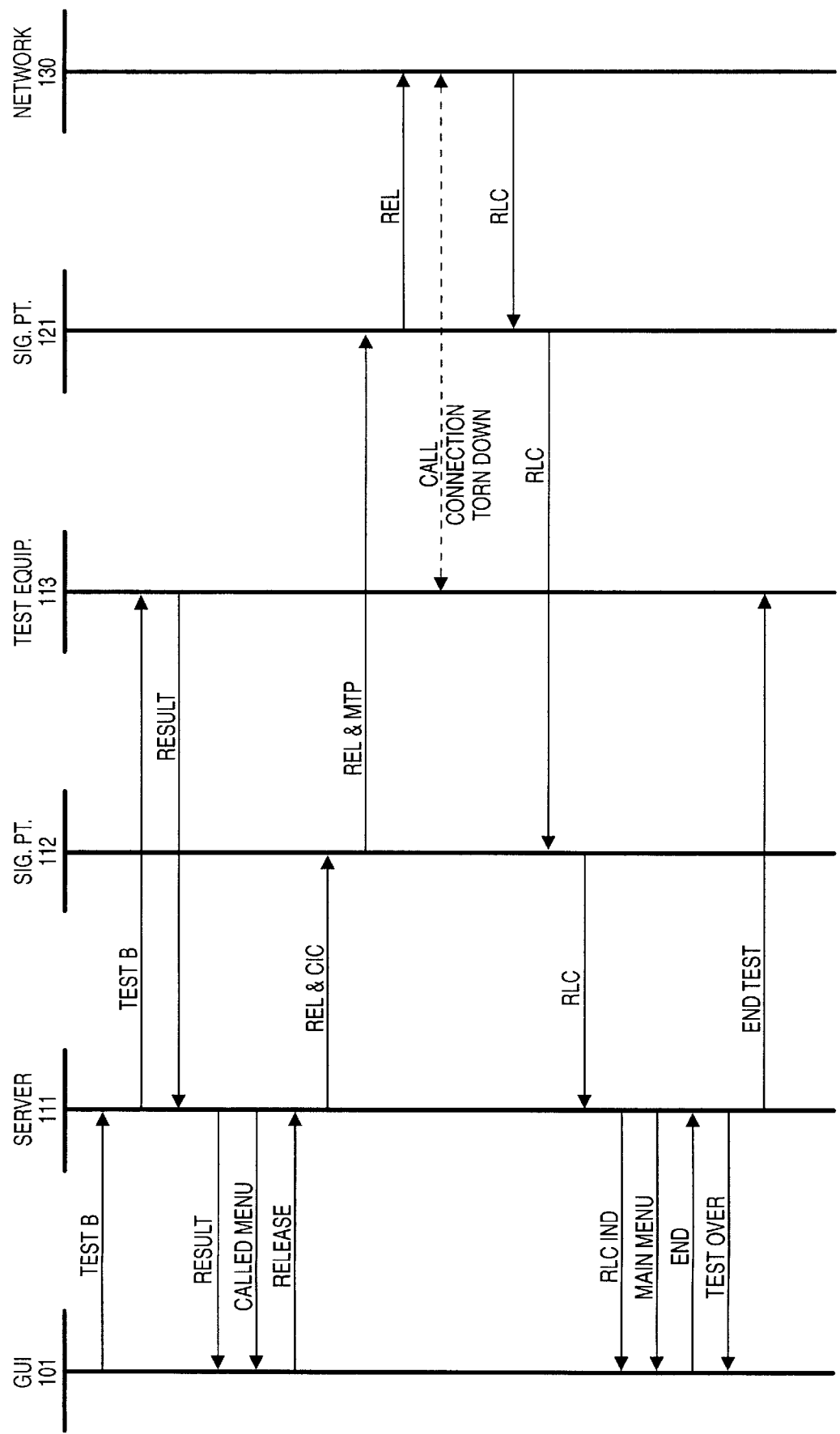

System Operation FIGS. 3–5

FIGS. 3–5 depict the operation of a specific configuration of the invention using a web user interface and SS7 signaling. The invention is not restricted to this exact configuration or operation. Those skilled in the art will appreciate numerous variations and substitutions that can be made that do depart from the scope of the invention.

The testing begins when the user enters the Uniform Resource Locator (URL) of the server 111 into the GUI 101. The GUI 101 connects to the server 111, and the server 111 returns a start menu that requests a user password and a CIC. The user enters the password and the CIC into the GUI 101, and the GUI 101 transfers the user information to the server 111. The server 111 checks the password and the CIC. If the password is legitimate and the CIC is idle, then the server 111 returns a main menu to the GUI 101. The main menu allows the user to select: 1) make a call, 2) wait for a call, or 3) end the session. The GUI transfers the user selection to the server 111.

If the user wants to make a call, then the server 111 returns a call menu to the GUI 101. The call menu allows the user return to the main menu or to input call information, such as: 1) the caller's number, 2) the called number, and 3) the bearer type. Examples of bearer type are voice, 56K data, and 64K data. The GUI 101 transfers the call information to the server 111. The server generates an SS7 Initial Address Message (IAM) from the call information and sends the IAM, along with the CIC, to the test signaling point 112. The test signaling point 112 applies MTP to the IAM based on the CIC and forwards the IAM to the signaling point 121. The switching system 120 processes the IAM and typically transfers an IAM for the call to the network 130. The switching system establishes a call connection from the DS0 represented by the CIC through the bearer circuits 122 to the network 130 in response to the IAM.

An SS7 Address Complete Message (ACM) is typically received from the network 130 after the IAM. The ACM is passed to the server 111 through the signaling points 112 and 121. The server 111 sends an ACM indication to the GUI 101. An SS7 Answer Message (ANM) is typically received from the network 130 after the ACM and is passed to the server 111 through the signaling points 112 and 121. The ANM indicates that the called party has answered and the call connection is established.

After the call is established, the server 111 sends a test menu to the GUI 101. The test menu allows the user to select tests to run on the call, or to release the call and return to the main menu. The GUI 101 transfers a user request for "TEST A" to the server 111. The server 111 transfers a test instruction to the test equipment identifying the requested test. The test equipment 112 runs the test and returns the test result to the server 111. The server 111 provides the test result to the GUI 101 along with the test menu. The GUI 101 then transfers the next user selection to the server 111.

If the user selects call release and return to main menu, then the server 11 generates a Release message (REL) and transfers the REL and CIC to the signaling point 112. The signaling point 112 applies MTP based on the CIC and forwards the REL to the signaling point 121. The signaling point 121 forwards the REL to the network 130. The switching system 120 tears down the call connection based on the REL. An SS7 Release Complete (RLC) is typically received from the network 130 in response to an REL. The RLC is passed to the server 111 through the signaling points 112 and 121. The server 111 provides an RLC indication and the main menu to the GUI 101.

If the user selects the wait for call option from the main menu, then the GUI 101 transfers the user selection to the server 111. The server 111 awaits the call. The incoming call is initiated by an incoming IAM from the network 130. The IAM is passed to the server 111 through the signaling points 112 and 121. The signaling point 112 automatically returns an ACM and an ANM to the signaling point 121 for transfer to the network 130. The switching system 120 establishes a call connection over the DS0 to the test equipment 113 in response to the incoming IAM.

The server 111 sends a called menu to the GUI 101. The called menu allows the user to select a test or to release the call and return to the main menu. If the user selects "TEST B", then the GUI 101 provides the user selection to the server 111. The server 111 sends a test instruction to the test equipment 113 to perform the selected test. The test equipment 113 runs the selected test and returns the test result to the server 111. The server 111 sends the test result and the called menu to the GUI 101.

If the user selects call release and return to main menu, then the server 111 generates an REL and transfers the REL and CIC to the signaling point 112. The signaling point 112 applies MTP based on the CIC and forwards the REL to the signaling point 121. The signaling point 121 forwards the REL to the network 130. The switching system 120 tears down the call connection based on the REL. An RLC is typically received from the network 130 in response to an REL. The RLC is passed to the server 111 through the signaling points 112 and 121. The server 111 provides an RLC indication and the main menu to the GUI 101.

If the user selects end session, then the GUI 101 sends the user selection to the server 111. The server 111 sends a session over indication to the GUI 101 and sends a test instruction to the test equipment indicating that the test is over. The GUI 101 disconnects from the server 111 and the test equipment 113 de-allocates the CIC.

Those skilled in the art will appreciate variations of the above-described embodiments that fall within the scope of the invention. As a result, the invention is not limited to the specific embodiments discussed above, but only by the following claims and their equivalents.

What is claimed is:

1. A method for operating a test system to test a switching system for use in a communications network, wherein the test system is operationally coupled to the switching system by a signaling link and a call connection and wherein the test system does not include a local access switch, the method comprising:

receiving a first user request to generate a call;

transferring signaling to the switching system over the signaling link wherein the signaling causes the switching system to extend the call connection;

receiving a second user request to run a test; and applying the test to the call connection.

2. The method of claim 1 wherein the user operates a graphical user interface that is operationally coupled to a test server in the test system, the method further comprising transferring information for a screen display from the test server to the graphical user interface.

3. The method of claim 2 further comprising receiving a user password from the graphical user interface into the test server in response to the screen display.

4. The method of claim 2 further comprising receiving a circuit identification code from the graphical user interface into the test server in response to the screen display.

5. The method of claim 2 further comprising receiving the first user request from the graphical user interface into the test server in response to the screen display.

6. The method of claim 2 firther comprising receiving a caller number from the graphical user interface into the test server in response to the screen display.

7. The method of claim 2 further comprising receiving a called number from the graphical user interface into the test server in response to the screen display.

8. The method of claim 2 further comprising receiving the second user request from the graphical user interface into the test server in response to the screen display.

9. The method of claim 8 wherein the test system further comprises test equipment operationally coupled to the test server and to the call connection and further comprising transferring a test instruction from the test server to the test equipment.

10. The method of claim 9 further comprising applying the test from the test equipment to the call connection in response to the test instruction from the call server.

11. The method of claim 10 further comprising transferring a test result from the test equipment to the test server.

12. The method of claim 11 further comprising transferring the test result from the test server to the graphical user interface.

13. The method of claim 12 wherein the test is a bit error rate test.

14. The method of claim 12 wherein the test is an analog voice test.

15. The method of claim 12 wherein the test is a data pattern test.

16. The method of claim 12 wherein the test is an echo return test.

17. The method of claim 2 further comprising receiving a release call instruction from the graphical user interface into the test server in response to the screen display.

18. The method of claim 2 further comprising receiving a wait for call instruction from the graphical user interface into the test server in response to the screen display.

19. The method of claim 2 further comprising receiving an end test instruction from the graphical user interface into the test server in response to the screen display.

20. The method of claim 2 further comprising transferring an address complete message indication from the test server to the graphical user interface.

21. The method of claim 2 further comprising transferring an answer message indication from the test server to the graphical user interface.

22. The method of claim 2 further comprising transferring a test result from the test server to the graphical user interface.

23. The method of claim 2 further comprising transferring a release complete message indication from the test server to the graphical user interface.

24. The method of claim 2 further comprising transferring an initial address message indication from the test server to the graphical user interface.

25. The method of claim 2 further comprising transferring a test session ended indication from the test server to the graphical user interface.

26. The method of claim 1 further comprising transferring signaling further comprises transferring an initial address message from the test system to the switching system.

27. The method of claim 26 further comprising receiving an address complete message from the switching system into the test system.

28. The method of claim 27 further comprising receiving an answer message from the switching system into the test system.

29. The method of claim 28 further comprising transferring a release message from the test system to the switching system.

30. The method of claim 29 further comprising receiving a release complete message from the switching system into the test system.

31. The method of claim 1 further comprising receiving a initial address message from the switching system into the test system.

32. The method of claim 31 further comprising transferring an address complete message from the test system to the switching system.

33. The method of claim 32 further comprising transferring an answer message from the test system to the switching system.

34. The method of claim 33 further comprising transferring a release message from the test system to the switching system.

35. The method of claim 1 wherein the graphical user interface is a computer with a web browser and wherein the test server is a web servers.

36. The method of claim 1 wherein the switching system is a tandem switching system.

37. A test system for testing a switching system for use in a communications network, wherein the switching system is coupled to a signaling link and a call connection, the test system comprising:

a test server operational to interface with a data link to a graphical user interface to receive user requests to generate calls and apply tests, to transfer signaling to generate the calls, and to transfer test instructions to apply the tests;

a signaling point coupled to the test server and operational to receive the signaling from the test server, to format the signaling, and to transfer the signaling to the signaling link; and test equipment coupled to the test server and operational to receive the test instructions and to apply the tests to the call connection.

38. The test system of claim 37 wherein the test server is a web server.

39. The test system of claim 37 further comprising an interworking unit coupled to the call connection between the test equipment and the switching system, wherein the interworking unit is operational to interwork a communications format used by the test equipment with another communications format used by the switching system.

40. The test system of claim 37 wherein the test equipment is operational to return a test result to the test server and the test server is operational to return the test result to the graphical user interface.

41. The test system of claim 37 wherein one of the tests is a bit error rate test.

42. The test system of claim 37 wherein one of the tests is an analog voice test.

43. The test system of claim 37 wherein one of the tests is a data pattern test.

44. The test system of claim 37 wherein one of the tests is an echo return test.

45. The test system of claim 37 wherein the test server and the signaling point do not comprise a local access switch.

46. The test system of claim 45 wherein the signaling point is further operational to transfer an initial address message to the switching system.

47. The test system of claim 45 wherein the signaling point is further operational to transfer an address complete message to the switching system.

48. The test system of claim 45 wherein the signaling point is further operational to transfer an answer message to the switching system.

49. The test system of claim 45 wherein the signaling point is further operational to transfer a release message to the switching system.

50. The test system of claim 45 wherein the signaling point is further operational to receive an initial address message from the switching system.

51. The test system of claim 45 wherein the signaling point is further operational to receive an address complete message from the switching system.

52. The test system of claim 45 wherein the signaling point is fiuther operational to receive an answer message from the switching system.

53. The test system of claim 45 wherein the signaling point is further operational to receive a release complete message from the switching system.

54. The test system of claim 37 wherein the switching system is a tandem switching system.

* * * * *